United States Patent [19]

Iida et al.

[11] Patent Number: 4,829,111
[45] Date of Patent: May 9, 1989

[54] STABILIZER COMPOSITION FOR SYNTHETIC RESIN AND SYNTHETIC RESIN COMPOSITION CONTAINING THE SAME

[75] Inventors: Kazuyuki Iida, Mie; Hiroyuki Omori, Tokyo; Akiyoshi Oonishi; Masami Takahashi, both of Mie, all of Japan

[73] Assignee: Mitsubishi Petrochemical Co., Ltd., Tokyo, Japan

[21] Appl. No.: 151,467

[22] Filed: Feb. 2, 1988

[51] Int. Cl.$^4$ ............................................. C08K 5/34
[52] U.S. Cl. ..................... 524/100; 524/99; 524/101; 524/102; 524/291; 524/326; 524/332; 524/342; 524/343; 524/349; 252/401; 252/403; 252/404
[58] Field of Search ............... 252/403, 401, 404; 524/99, 100, 101, 102, 291, 326, 332, 342, 343, 349

[56] References Cited

U.S. PATENT DOCUMENTS

| | | | |
|---|---|---|---|
| 3,899,491 | 8/1975 | Ramey et al. | 524/100 |
| 3,920,659 | 11/1975 | Ramey et al. | 524/100 |
| 3,992,351 | 11/1976 | Ramey et al. | 524/100 |
| 4,067,848 | 1/1978 | Ramey et al. | 524/100 |
| 4,373,042 | 2/1983 | Gratani et al. | 524/100 |

FOREIGN PATENT DOCUMENTS 878067 4/1967 Japan .
1064404 4/1967 United Kingdom .

*Primary Examiner*—John Kight
*Assistant Examiner*—Kriellion Morgan
*Attorney, Agent, or Firm*—Oblon, Fisher, Spivak, McClelland & Maier

[57] ABSTRACT

A stabilizer composition for synthetic resin is described comprising a piperazine derivative represented by the following formula (I):

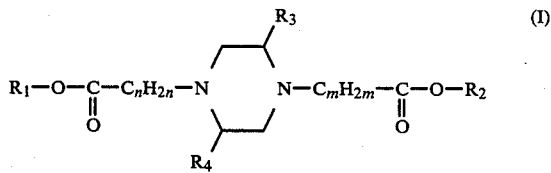

wherein $R_1$ and $R_2$ each represents an alkyl group having from 12 to 20 carbon atoms or a 2,2,6,6-tetramethyl-4-piperidyl group; $R_3$ and $R_4$ each represents a hydrogen atom or a methyl group; and n and m each represents 2 or 3.

A synthetic resin composition is also described comprising polyolefin and the aforesaid piperazine derivative.

7 Claims, No Drawings

STABILIZER COMPOSITION FOR SYNTHETIC RESIN AND SYNTHETIC RESIN COMPOSITION CONTAINING THE SAME

FIELD OF THE INVENTION

This invention relates to a novel stabilizer composition which is compounded with a synthetic resin for restraining the occurrence of deterioration of the resin by heat, oxidation, and light. Also, the invention relates to a synthetic resin composition containing the stabilizer composition useful for transport crate, agricultural films, external articles for automobiles, hollow containers, etc.

BACKGROUND OF THE INVENTION

It is generally known that synthetic resins such as polyethylene, polypropylene, polyvinyl chloride, an acrylonitrile-butadiene-styrene (ABS) resin, etc., cause change of color, deterioration of mechanical strength, etc. due to heat deterioration and/or oxidation at molding or fabrication thereof and furthermore due to deterioration of weather resistance, that is, deterioration mainly by the action of ultraviolet rays and/or oxygen even after being formed into articles, and hence these articles can not endure the long use thereof.

For overcoming these faults, it is necessary to restain the occurrences of various deteriorations by adding one or more kinds of heat stabilizers or light stabilizers to the synthetic resin. As such a heat stabilizer, a combination of a phenolic compound such as tetrakis[methylene-3-(3,5-di-t-butyl-4-hydroxyphenyl)propionate]methane (Irganox 1010, trade name, made by Ciba-Geigy Aktiengesellschaft), etc., and a sulfur-series compound such as dimyristyl thiodipropionate, etc., is generally used and as such a light stabilizer, hindered amine-series compounds such as bis(2,2,6,6-tetramethyl-4-piperidyl) sebacate (Sanol LS770, trade name, made by Sankyo Co., Ltd.) are generally known.

However, it is known that there is an antagonism between a certain kind of heat stabilizer and a certain kind of light stabilizer. When Irganox 1010 is used as a phenolic antioxidant for improving the heat resistance of a synthetic resin and simultaneously Sanol LS770 is added to the synthetic resin for improving the weather resistance, the synthetic resin having both the heat stability and the light stability can be obtained. However, when in the case of requiring more excellent heat stability, sulfur-series compound such as dimyristyl thiodipropionate, etc., which shows a synergistic effect with the phenolic compound, is additionally used for aforesaid synthetic resin, the thus obtained synthetic resin has the excellent heat stability but has the greatly reduced weather resistance. In other words, there clearly exists a phenomenon of antagonism between a hindered amine-series light stabilizer and a sulfur-series antioxidant.

SUMMARY OF THE INVENTION

As the result of various investigations under the aforesaid circumstances, it has been discovered that when a piperazine derivative represented by the following formula (I) is used, a synthetic resin having greatly improved heat aging resistance without reducing the weather resistance is obtained even in the system of co-using a phenolic antioxidant and a hindered amine-series light stabilizer:

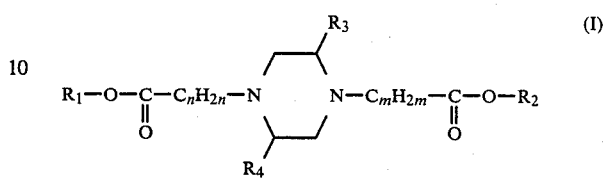

wherein $R_1$ and $R_2$ each represents an alkyl group having from 12 to 20 carbon atoms or a 2,2,6,6-tetramethyl-4-piperidyl group; $R_3$ and $R_4$ each represents a hydrogen atom or a methyl group; and n and m each represents 2 or 3.

The piperazine derivative shown by the formula (I) described above shows a synergistic effect with various phenolic antioxidants as well as has practically excellent features that when the piperazine derivative is compounded with a synthetic resin solely, it imparts excellent weather resistance to the synthetic resin and further the occurrence of deterioration by heat at molding can be prevented, and further since the derivative contains no sulfur atom in the molecule, the derivative gives no oder at molding or handling the resin containing the derivative as compared to sulfur-series antioxidants.

Therefore, the present invention is to provide a stabilizer composition for synthetic resin comprising a piperazine derivative represented by the aforesaid formula (I).

Furthermore, the present invention is to provide a synthetic resin composition comprising polyolefin and a piperazine derivative represented by the aforesaid formula (I).

DETAILED DESCRIPTION OF THE INVENTION

The piperazine derivative shown by aforesaid formula (I) can be easily obtained by reacting, for example, piperazine and an alkyl ester of acrylic acid, methacrylic acid, or crotonic acid. In this case, the alkyl group of the alcohol residue forming the alkyl ester has preferably from 12 to 20 carbon atoms for practical use and the case that the alkyl group has too small carbon atoms such as not more than 5 is insufficient in performance and is not suitable for practical use. Furthermore, in place of piperazine, 2,5-dialkyl-substituted piperazine, such as 2,5-dimethylpiperazine can be used for producing the piperazine derivative.

Moreover, the piperazine derivative produced from the ester of 2,2,6,6-tetramethylpiperidinol is a stabilizer capable of giving sufficient weather resistance to synthetic resins without need of a light stabilizer.

Typical examples of the piperazine derivative shown by the formula (I) are illustrated below.

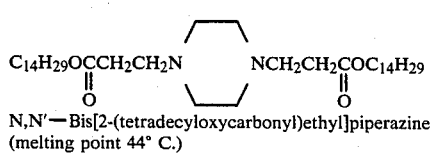

N,N′—Bis[2-(tetradecyloxycarbonyl)ethyl]piperazine
(melting point 44° C.)

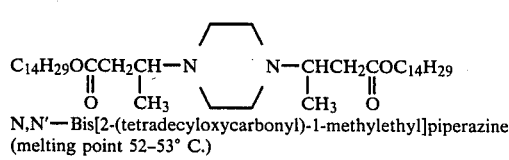

N,N′—Bis[2-(tetradecyloxycarbonyl)-1-methylethyl]piperazine
(melting point 52–53° C.)

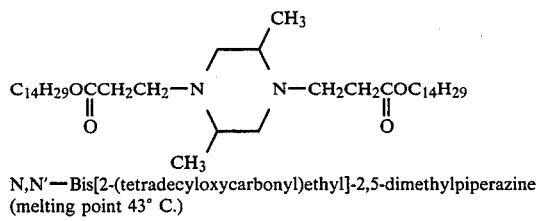 (3)

N,N'—Bis[2-(tetradecyloxycarbonyl)ethyl]-2,5-dimethylpiperazine
(melting point 43° C.)

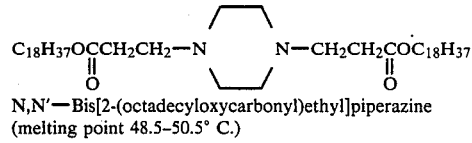 (4)

N,N'—Bis[2-(octadecyloxycarbonyl)ethyl]piperazine
(melting point 48.5–50.5° C.)

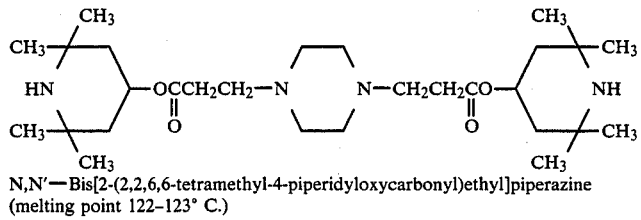 (5)

N,N'—Bis[2-(2,2,6,6-tetramethyl-4-piperidyloxycarbonyl)ethyl]piperazine
(melting point 122–123° C.)

The addition amount of the piperazine derivative shown by the formula (I) described above is from 0.05 to 1 part by weight, and preferably from 0.08 to 0.5 part by weight per 100 parts by weight of synthetic resin.

The stabilizer composition of this invention can comprise a heat stabilizer and/or a light stabilizer to obtain resin articles having excellent heat stability and weather resistance. In particular, the stabilizer composition of this invention shows a synergistic effect when it comprises the piperazine derivative represented by the aforesaid formula (I) and a phenolic antioxidant and in this case, resin articles having excellent heat stability can be obtained.

Examples of the phenolic antioxidant which can be used in the stabilizer composition of this invention are 2,6-di-t-butyl-p-cresol, stearyl(3,6-di-t-methyl-4-hydroxybenzyl) thioglycollate, stearyl-β-(4-hydroxy-3,5-di-t-butylphenyl) propionate, distearyl(4-hydroxy-3-methyl-5-t-butyl)benzyl malonate, 2,2'-methylenebis(4-methyl-6-t-butylphenol), 4,4'-methylenebis(2,6-di-t-butylphenol), 2,2'-methylenebis[6-(1-methylcyclohexyl)-p-cresol], bis[3,3-bis(4-hydroxy-3-t-butylphenyl)butyric acid] glycol ester, 4,4'-butylidenebis(6-t-butyl-m-cresol), 1,1,3-tris(2-methyl-4-hydroxy-5-t-butylphenyl)butane, 1,3,5-tris(3,5-di-t-butyl-4-hydroxybenzyl)-2,4,6-trimethylbenzene, tetrakis[methylene-3-(3,5-di-t-butyl-4-hydroxyphenyl) propionate]methane, 1,3,5-tris(3,5-di-t-butyl-4-hydroxybenzyl) isocyanurate, 1,3,5tris[(3,5-di-t-butyl-4-hydroxyphenyl)propionyloxyethyl) isocyanurate, 2-octylthio-4,6-di(4-hydroxy-3,5-di-t-butyl)phenoxy-1,3,5-triazine, 4,4'-thiobis(6-t-butyl-m-cresol), etc.

The amount of the phenolic antioxidant being used in the stabilizer composition of this invention is from 0.05 to 1 part by weight per 100 parts by weight of synthetic resin.

When the stabilizer composition of this invention comprises a phenolic antioxidant and a hindered amine-series light stabilizer, there exists no antagonism therebetween and thus a synthetic resin having excellent heat aging resistance and weather resistance can be obtained.

Examples of such hindered amine-series light stabilizer are compounds having 2,2,6,6-tetramethyl-4-piperidyl group, such as bis(2,2,6,6-tetramethyl-4-piperidyl) sebacate, bis[N-methyl-2,2,6,6-tetramethyl-4-piperidyl]sebacate, phenyl-4-piperidyl carbonate, tetrakis(2,2,6,6-tetramethyl-4-piperidyl)-1,2,3,4-butane tetracarboxylate, poly{[6(1,1,3,3-tetramethylbutylimino)-1,3,5-triazine-2,4-diyl][4(2,2,6,6-tetramethylpiperidyl)iminohexamethylene[4-(2,2,6,6tetramethylpiperidyl)imino]}, etc.

The aforesaid light stabilizer is used in an amount of from 0.05 to 1 part by weight per 100 parts by weight of synthetic resin.

Also, by adding a phosphite-series compound to the resin composition comprising the piperazine derivative represented by the aforesaid formula (I) and a phenolic antioxidant, the heat resistance and the weather resistance can be further improved. Examples of the phosphite-series compound are trioctyl phosphite, trilauryl phosphite, triphenyl phosphite, tris(nonylphenyl) phosphite, distearylpentaerylthritol diphosphite, etc.

Furthermore, if necessary, a light stabilizer (ultraviolet ray absorbent) can be further added to the resin composition for further improving the weather resistance thereof. Such light stabilizers include benzophenone-series compounds, benzotriazole-series compounds, succinate-series compounds, substituted acrylonitrile-series compounds, nickel complex salt-series compounds, etc. Such a light stabilizer is used in an amount of from 0.05 to 5 parts by weight, and preferably from 0.1 to 2 parts by weight per 100 parts by weight of synthetic resin.

Furthermore, the resin compositions of this invention may, if necessary, contain other additives such as pigments, fillers, foaming agents, antistatics, anticlouding agents, surface treating agents, lubricants, flame retarders, metal inactivators, nucleating agents, metal soaps, transparency-imparting agents, processing aids, antifungal agents, sterilizers, mold releasing agents, etc.

Then, examples of synthetic resins with which the stabilizer composition of this invention is compounded are halogen-containing synthetic resins such as polyvinyl chloride, polyvinyl bromide, polyvinyl fluoride, polyvinylidene chloride, chlorinated polyethylene, chlorinated polypropylene, polyvinylidene fluoride, brominated polyethylene, chlorinated rubber, a vinyl chloride-vinyl acetate copolymer, a vinyl chloride-ethylene copolymer, a vinyl chloridepropylene copolymer, a vinyl chloride-styrene copolymer, a vinyl chloride-isobutylene copolymer, a vinyl chloridevinylidene chloride copolymer, a vinyl chloride-styrenemaleic anhydride terpolymer, a vinyl chloride-styreneacrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate terpolymer, a vinyl chloride-acrylic acid ester copolymer, a vinyl chloride-maleic acid ester copolymer, a vinyl chloride-methacrylic acid ester copolymer, a vinyl chloride-acrylonitrile copolymer, internally plasticized polyvinyl chloride, etc.; α-olefin polymers such as polyethylene, polypropylene, polybutene-1, etc. and α-olefin copolymers such as an ethylene-propylene random or block copolymer, etc.; copolymers of α-olefin and a vinyl monomer, such as maleic anhydride-denatured polypropylene, etc.; polystyrene; polyvinyl acetate; acryl resins; copolymers of styrene and other monomer (e.g., maleic anhydride, butadiene, acrylonitrile, etc.); methacrylate resins such as an acrylonitrile-butadiene-styrene copolymer, an acrylic acid ester-butadiene-styrene copolymer, a methacrylic acid ester-butadiene-styrene copolymer, polymethyl methacrylate, etc.; polyvinyl alcohol; polyvinylformal; polyvinylbutyral; straight chain polyester; polyamide; polycarbonate; polyacetal; polyurethane; cellulose-series resins; phenol resins; urea resins; melamine resins; epoxy resins; unsaturated polyester resins; silicone resins; etc.

Furthermore, rubbers such as isoprene rubber, butadiene rubber, acrylonitrile-butadiene copolymer rubber, styrene-butadiene copolymer rubber, etc., or blends of them may be used as the synthetic resin in this invention.

Preferred example of the synthetic resin is polyolefin. More preferred example thereof is polypropylene.

Then, the invention is explained more practically by the following synthesis examples and examples of this invention but the invention is not limited to them.

SYNTHESIS EXAMPLE 1

Synthesis of Compound (1)

In a four neck flask were placed 100 g of myristyl acrylate, 1.61 g of piperazine, and 60 ml of ethanol and the mixture was heated with stirring in a nitrogen gas stream. After heating the mixture at 60° C. for 5 hours, the reaction mixture was cooled to room temperature to deposit white crystals, which were collected by filtration and recrystallized from ethanol to provide 10.6 g (yield of 91%) of the desired product.

The analytical values of the product were as follows.

$H^1$-Nuclear Magnetic Resonance (NMR) Absorption Spectra [CDCl$_3$, δ(ppm)]: 0.70 to 1.76 (54H, m), 2.26 to 2.87 (16H, m), 4.05 (4H,t).

Infrared (IR) Absorption Spectra [KBr, wave number (cm$^{-1}$)]: 2910, 1730, 1325, 1310, 1185, 1155, 720.

Mass Spectra (MS) [m/e, precise mass analysis]: 622.6 (M+).

SYNTHESIS EXAMPLE 2

Synthesis of Compound (2)

In a four neck flask were placed 10.0 g of myristyl crotonate, 1.53 g of piperazine, and 60 ml of ethanol and the mixture was heated with stirring in a nitrogen gas stream. After heating the mixture at 60° C. for 10 hours, the reaction mixture was cooled to room temperature to deposit white crystals, which were collected by filtration and recrystallized from ethanol to provide 2.7 g (yield of 23.4%) of the desired product.

The analytical values of the product were as follows.

$H^1$-NMR Absorption Spectra [CDCl$_3$, δ(ppm)]: 0.66 to 1.83 (60H, m), 2.07 to 2.75 (12H, m), 2.90 to 3.33 (2H, m), 4.03 (4H, t).

IR Absorption Spectra [KBr, wave number (cm$^{-1}$)]: 2940, 1735, 1330, 1195, 1155.

MS [m/e, (relative intensity)]: 650 (43, M+), 394 (62), 326 (43), 113 (100), 87 (41).

SYNTHESIS EXAMPLE 3

Synthesis of Compound (5)

In a four neck flask were placed 15.0 g of 2,2,6,6-tetramethyl-4-acryloyloxy-piperidine, 3.0 g of piperazine, 60 ml of ethanol and the mixture was heated with stirring in a nitrogen gas stream. After heating the mixture at 60° C. for 5 hours, the reaction mixture was cooled to room temperature and ethanol was distilled off under reduced pressure to deposit white crystals, which were collected by filtration and recrystallized from acetone to provide 16.4 g (yield of 93%) of the desired product.

The analytical values of the product were as follows.

$H^1$-NMR Absorption Spectra [CDCl$_3$, δ(ppm)]: 0.65 to 1.40 (30H, m), 1.93 (4H, dd), 2.26 to 2.90 (16H, m), 4.92 to 5.55 (2H, m).

IR Absorption Spectra [KBr, wave number (cm$^{-1}$)]: 3310, 2975, 1720, 1345, 1300, 1235, 1175, 750.

MS [m/e (relative intensity)]: 508 (1, M+), 140 (33), 124 (100), 58 (27).

EXAMPLE 1 AND COMPARISON EXAMPLES 1 AND 2

(Heat Aging Resistance and Weather Resistance)

After compounding 100 parts by weight of a polypropylene powder having an intrinsic viscosity measured in tetralin at 135° C. of 1.9 and containing isotactic polypropylene in an amount of 98% by weight per total weight of the polypropylene powder with 0.2 part by weight of the compound prepared in Synthesis Example 1 described above and the mixture was sufficiently mixed in a mixer. Then, the mixture was melt-kneaded by means of an extruder having a cylinder temperature of 260° C., L/D of 20, and a diameter of 20 mm to provide pellets. The pellets thus obtained were press-molded at 230° C. to form a sheet of 0.5 mm as a test piece.

The heat aging resistance of the test piece was determined by heating the test piece in a circulation system air heating oven of 150° C. and measuring the time of becoming brown and brittle by oxidative deterioration.

The weather resistance of the test piece was determined by irradiating the test piece with light using a xenon weather-o-meter Type 65/XW-WR, made by Atlas Co. at a black panel temperature of 80° C. and measuring the time of becoming brittle and causing crack in the test piece when the test piece was bent at 180° C.

In addition, the same tests as above were performed on the cases of adding no compound of this invention to propylene and also of adding N,N'-bis[2-(methoxyloxycarbonyl)methyl]piperazine (P-1) as comparison examples.

The results obtained are shown in Table 1 below.

In addition, the abbreviation in the table was as follows.

P-1: N,N-Bis[2-(methyloxycarbonyl)methyl]piperazine.

TABLE 1

| | Additive (0.2 wt part) | Evaluation Result | |
|---|---|---|---|
| | | Heat aging Resistance (hr.) | Weather Resistance (hr.) |
| Comparison Example 1 | — | <2 | 20 |
| Comparison Example 2 | P-1 | <5 | 120 |
| Example 1 | Compound (1) | 30 | 390 |

EXAMPLES 2 TO 7 AND COMPARISON EXAMPLES 3 AND 4

The same procedure as Example 1 was followed while using each of the additive shown in Table 2 below. The results thus obtained are shown in Table 2.

The abbreviations shown in the table were as follows.

F-1: Tetrakis[3-(3,5-di-t-butyl-4-hydroxyphenyl)propionyloxymethyl]methane
(Irganox 1010, trade name, made by Ciba-Geigy Aktiengesellschaft)

F-2 Tris(3,5-di-t-butyl-4-hydroxybenzyl) isocyanurate
(Goodrite 3114, trade name, made by Goodrich Co.)

TABLE 2

| | Additive | | Evaluation Result | |
|---|---|---|---|---|
| | Phenolic Antioxidant (0.1 wt part) | Compound of the Invention (0.2 wt part) | Heat Aging Resistance (hr.) | Weather Resistance (hr.) |
| Comparison Example 3 | F-1 | — | 740 | 140 |
| Example 2 | " | Compound (1) | 940 | 380 |
| Example 3 | " | Compound (1)* | 1150 | 360 |
| Example 4 | " | Compound (2) | 1100 | 320 |
| Example 5 | " | Compound (3) | 890 | 300 |
| Example 6 | " | Compound (4) | 900 | 280 |
| Comparison Example 4 | F-2 | — | 30 | 260 |
| Example 7 | " | Compound (1) | 970 | 440 |

* 0.2 part by weight of distearylpentaerythritol diphosphite (W-618) (Weston 618, trade name, made by Borg-Warner Corporation) was further added.

EXAMPLES 8 TO 12 AND COMPARISON EXAMPLES 5 AND 6

The same procedure as in Example 1 was followed while using each of the additives shown in Table 3. The results obtained are shown in Table 3.

The abbreviations shown in the table were as follows.

DMTDP: Dimyristyl thiodipropionate (DMYD "Yoshitomi", trade name, made by Yoshitomi Pharmaceutical Industries, Ltd.)

LS-770: Bis[2,2,6,6-tetramethyl-4-piperidyl] sebacate (Sanol LS-770, trade name, made by Sankyo Co.)

F-1 is the same as described above.

TABLE 3

| | Additive | | | | Evaluation Result | |
|---|---|---|---|---|---|---|
| | Phenolic Antioxidant (0.1 wt part) | Sulfur-Series Antioxidant (0.2 wt part) | Light Stabilizer (0.2 wt part) | Compound of the Invention (0.2 wt part) | Heat Aging Resistance (hr.) | Weather Resistance (hr.) |
| Comparison Example 5 | F-1 | — | LS-770 | — | 400 | 710 |
| Comparison Example 6 | " | DMTDP | " | — | 1080 | 430 |
| Example 8 | " | — | " | Compound (1) | 940 | 700 |
| Example 9 | " | — | " | Compound (2) | 920 | 700 |
| Example 10 | " | — | " | Compound (3) | 880 | 690 |
| Example 11 | " | — | " | Compound (4) | 890 | 680 |
| Example 12 | " | — | — | Compound (5) | 500 | 860 |

EXAMPLES 13 TO 17 AND COMPARISON EXAMPLES 7 TO 9

(Processing Stability)

MFR (JIS K-6758) of the pellets of polypropylene obtained in Example 1 was measured at 230° C. MFR is one index of molecular weight. That is, lower MFR shows that the reduction of molecular weight of the polymer deteriorated by oxidation in an extruder is less, which also shows that in the case of using a stabilizer, the effect of the stabilizer is larger. The results are shown in Table 4 below.

The abbreviations shown in the table were as follows.
BHT: 2,6-Di-t-butyl-p-cresol
F-1 and W-618 are the same as described above.

TABLE 4

| | Additive (wt part) | | | MFR (g/10 min) |
|---|---|---|---|---|
| | Phenolic Antioxidant | Phosphor-Series Antioxidant | Compound of the Invention | |
| Comparison Example 7 | — | — | — | 13.7 |
| Comparison Example 8 | BHT (0.1) | — | — | 6.8 |
| Example 13 | — | — | Compound (1) (0.2) | 5.2 |
| Comparison Example 9 | F-1 (0.1) | — | — | 4.6 |

TABLE 4-continued

| | Additive (wt part) | | | MFR |
|---|---|---|---|---|
| | Phenolic Antioxidant | Phosphor-Series Antioxidant | Compound of the Invention | (g/10 min) |
| Example 14 | F-1 (0.1) | W-618 (0.2) | Compound (1) (0.2) | 4.4 |
| Example 15 | — | — | Compound (2) (0.2) | 5.5 |
| Example 16 | — | — | Compound (3) (0.2) | 5.8 |
| Example 17 | — | — | Compound (4) (0.2) | 5.2 |

While the invention has been described in detail and with reference to specific embodiments thereof, it will be apparent to one skilled in the art that various changes and modifications can be made therein without departing from the spirit and scope thereof.

What is claimed is:

1. A stabilizer composition for synthetic resin comprising a piperazine derivative represented by the following formula (I):

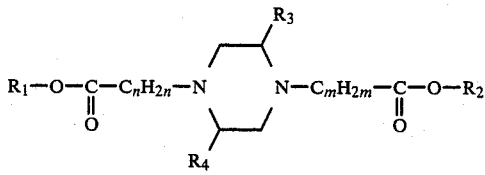

wherein $R_1$ and $R_2$ each represents an alkyl group having from 12 to 20 carbon atoms or a 2,2,6,6-tetramethyl-4-piperidyl group; $R_3$ and $R_4$ each represent a hydrogen atom or a methyl group; and n and m each represents 2 or 3.

2. The stabilizer composition for synthetic resin as claimed in claim 1, wherein the stabilizer composition further comprises a phenolic antioxidant selected from the group consisting of 2,6-di-t-butyl-p-cresol, stearyl-β-(4-hydroxy-3,5-di-t-buylphenyl) propionate, distearyl(4-hydroxy-3-methyl-5-t-butyl)-benzyl malonate, 2,2'-methylenebis(4-methyl-6-t-butylphenol), 4,4'-methylenebis(2,6-di-t-butyl-phenol), 2,2'-methylenebix(6-(1-methylcyclohexyl)-p-cresol), bis(3,3-bis(4-hydroxy-3-t-butylphenyl)butyric acid) glycol ester, 4,4'-butylidenebis(6-t-butyl-m-cresol), 1,1,3-tris(2-methyl-4-hydroxy-5-t-butyl-phenyl)butane, 1,3,5-tris(3,5-di-t-butyl-4-hydroxy-benzyl)-2,4,6-trimethyl-benzene, tetrakis(methylene-3-(3,5-di-t-butyl-4hydroxyphenyl)propionate)methane, 1,3,5-tris(3,5-di-t-butyl-4-hydroxybenzyl) isocyanurate, 1,3,5,-tris(3,5-di-t-butyl-4-hydroxyphenyl)-propionyloxyethyl) isocyanurate, 2-octylthio-4,6-di(4-hydroxy-3,5-di-t-butyl) phenoxy-1,3,5-triazine and 4,4? -thiobis (6-t-butyl-m-cresol).

3. The stabilizer composition for synthetic resin as claimed in claim 1, wherein the stabilizer composition further comprises a hindered amine-series light stabilizer selected from the group consisting of bis(2,2,6,6-tetramethyl-4-piperidyl) sebacate, bis(N-methyl-2,2,6,6-tetramethyl-4-piperidyl) sebacate, phenyl-4-piperidyl carbonate, tetrakis-(2,2,6,6-tetramethyl-4-piperidyl)-b 1,2,3,4-butane tetracarboxylate and poly{(6-1,1,3,3-tetramethylbutylimino)-1,3,5-triazine-2,4-diyl)(4-2,2,6,6-tetramethylpiperidyl)iminohexamethylene(4-(2,2,6,6-tetramethylpiperidyl)imino)}.

4. A synthetic resin composition comprising polyolefin and a piperazine derivative represented by the following formula (I):

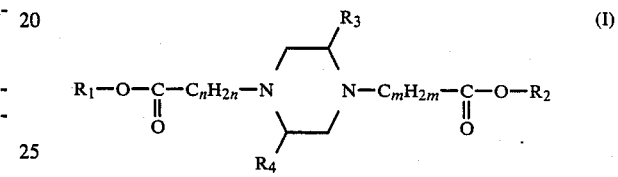

wherein $R_1$ and $R_2$ each represents an alkyl group having from 12 to 20 carbon atoms or a 2,2,6,6-tetramethyl-4-piperidyl group; $R_3$ and $R_4$ each represents a hydrogen atom or a methyl group; and n and m each represents 2 or 3.

5. The synthetic resin composition as claimed in claim 4, wherein the composition further comprises an phenolic antioxidant selected from the group consisting of 2,6-di-t-butyl-p-cresol, stearyl-(3,6-di-t-methyl-4-hydroxy-benzyl) thioglycollate, stearyl-β-(4-hydroxy-3,5-di-t-butylphenyl) propionate, distearyl(4-hydroxy-3-methyl-5-t-butyl)-benzyl malonate, 2,2? -methylenebis(4-methyl-6-t-butylphenol), 4,4'-methylenebis(2,6-di-t-butylphenol), 2,2'-methylenebis(6-(1-methylcyclohexyl)-p-cresol), bis(3,3-bis(4-hydroxy-3-t-butylphenyl) butyric acid) glycol ester, 4,4'-butylidenebis(6-t-butyl-m-cresol), 1,1,3-tris (2-methyl-4-hydroxy-5-t-butylphenyl)butane, 1,3,5-tris (3,5-di-t-butyl-4-hydroxybenzyl)-2,4,6-trimethylbenzene, tetrakis(methylene-3-(3,5-di-t-butyl-4-hydroxyphenyl) propionate)methane, 1,3,5-tris(3,5-di-t-butyl-4-hydroxybenzyl) isocyanurate, 1,3,5,-tris(3,5-di-t-butyl-4-hydroxyphenyl)propionyloxyethyl) isocyanurate, 2-octylthio-4,6-di(4-hydroxy-3,5-di-t-butyl) phenoxy-1,3,5-triazine and 4,4? -thiobis(6-t-butyl-m-cresol).

6. The synthetic resin composition as claimed in claim 4, wherein the composition further comprises a hindered amine-series light stabilizer selected from the group consisting of bis(2,2,6,6-tetramethyl-4-piperidyl) sebacate, bis(N-methyl-2,2,6,6-tetramethyl-4-piperidyl) sebacate, phenyl-4-piperidyl carbonate, tetrakis(2,2,6,6-tetramethyl-4-piperidyl)-1,2,3,4-butane tetracarboxylate and poly{(6-1,1,3,3,-tetramethylbutylimino)-1,3,5triazine-2,4- diyl)(4-2,2,6,6-tetramethylpiperidyl)iminohexamethylene(4-(2,2,6,6-tetramethylpiperidyl)imino)}.

7. The synthetic resin composition as claimed in claim 4, wherein the polyolefin is polypropylene.

* * * * *